US006317307B1

(12) United States Patent
Bone et al.

(10) Patent No.: US 6,317,307 B1
(45) Date of Patent: Nov. 13, 2001

(54) COAXIAL FUSE AND PROTECTOR

(75) Inventors: Jon E. Bone, Carrollton; John J. Naplorkowski, Irving; Josh M. Wllken, N. Richland Hills, all of TX (US)

(73) Assignee: Siecor Operations, LLC, Hickory, NC (US)

(*) Notice: Subject to any disclaimer, the term of this patent is extended or adjusted under 35 U.S.C. 154(b) by 0 days.

(21) Appl. No.: 09/167,756

(22) Filed: Oct. 7, 1998

(51) Int. Cl.[7] ...................................................... H02H 1/00

(52) U.S. Cl. ............................................ 361/124; 361/600

(58) Field of Search .................................... 361/124–127, 361/91.1, 93.9, 103, 104, 111, 113, 117–120, 605, 275.1, 275.4; 174/6, 7, 78, 75 C; 337/31, 32, 142, 158–160, 186, 221, 227, 231

(56) References Cited

U.S. PATENT DOCUMENTS 4,335,415 * 6/1982 Hooberry ............................ 361/104
4,633,359 12/1986 Mickelson et al. .................. 361/119
5,157,580 * 10/1992 Hegner et al. ....................... 361/119
5,319,515 6/1994 Pryer et al. ............................ 361/93
5,724,220 * 3/1998 Chaudhry ............................. 361/119
5,726,851 * 3/1998 Knapp ................................. 361/104

* cited by examiner

*Primary Examiner*—Lincoln Donovan

(57) ABSTRACT

A protective device for excess current utilizes a fuse that incorporates a printed circuit board. The printed circuit board has a trace on one side which is of a desired width, length, and thickness of material for opening if excess current for a selected duration of time is reached. The printed circuit board is mounted in an insulated housing. The lower side of the substrate may also have a conductive layer connected to the housing or ground. The printed circuit board and overvoltage protector may be tailored for impedance matching. An excess voltage protector may be incorporated with the printed circuit board for conducting to ground if excessive voltage is encountered. The housing has two terminals which are connected to the printed circuit board and voltage protector. These terminals may be conventional coaxial cable connectors.

4 Claims, 2 Drawing Sheets

COAXIAL FUSE AND PROTECTOR

TECHNICAL FIELD

This invention relates in general to protection devices for protecting circuits against excess current and voltage, and in particular to a protection device for a coaxial cable.

BACKGROUND ART

Coaxial cable is in widespread use for transmitting signals, particularly over cable television lines. A coaxial cable has a center conductor that is insulated. An outer conductor, which may be foil, woven, or multiple layers of both, surrounds the inner conductor insulation. Although is has been a longstanding practice to provide a protective device at the junction box between the telephone company lines, which are twisted-pairs, and equipment in a home or business, this has not been widely used with coaxial distribution lines. For telephone cable lines, the protection device includeds an excess voltage protector that conducts to a ground when encountering excessive voltage. The excess voltage protector may be of a gas tube type or solid state. For excess current protection, a fuse will be provided.

Overcurrent protection devices have been used to some extent for coaxial cables. One prior practice has been to connect into the line a relatively long length, approximately 20 inches, of coaxial cable with a center conductor wire that has a gage two or three sizes smaller than the gage of the network center conductor wire. This technique is not completely reliable as the coaxial cable intended to be a fuse link does not always open in a predictable location. For example, the coaxial connector may inadvertently act as the fusible element, which is unsatisfactory. Another technique is to use a medium length coaxial cable, less than three inches, which has been designed with an extremely small gage center wire. This particular type is difficult to manufacture. Available overcurrent protection devices are usually contained in a physically separate package from overvoltage protection devices.

Another problem dealing with protection devices involves characteristic impedance mismatch. It is important to match the characteristic impedance of the protection device to the characteristic impedance of the transmission line, which in the case of coaxial cable for cable television applications is typically 75 ohms. Impedance mismatch may result in unacceptable insertion loss and return loss characteristics, which results in data loss. Overvoltage protection elements, such as air gaps, gas tubes, or solid state devices such as thyristors, have a capacitance that is often many magnitudes larger than the inherent capacitance of the transmission line in the network they are designed to protect. When these devices are inserted into the transmission line, the characteristic impedance of the network becomes mismatched in the area of the protector and signal losses occur.

DISCLOSURE OF THE INVENTION

In the invention, the fuse assembly comprises a trace formed on a thin, flat dielectric substrate, creating a printed circuit board. The trace has a length, width, and thickness that is designed to open if a selected current for a selected time duration is reached. The substrate preferably has a second side that is coated with a conductive layer having a greater cross-sectional area than the trace. The trace its connected in a series arrangement to the center conductor of a coaxial cable while the conductor layer on the opposite side is connected in a series arrangement to the outer conductor of the coaxial cable. The printed circuit board, connected in series with the inner and outer conductors of the coaxial cable becomes a microstrip transmission line with a characteristic impedance designed to match that of the coaxial cable. In the preferred embodiment, the printed circuit board is mounted and insulated within a housing.

Also, an excess voltage protector may be mounted in the housing, preferably in a chamber separate from the fuse. The excess voltage protector may be an air gap, gas tube, or a thyristor type protector.

The excess voltage protector has a capacitance that must be accounted for in matching the characteristic impedance of the protector to the coaxial cable transmission line. The overcurrent protector trace width, thickness, configuration, and circuit board material may be designed to provide a designed impedance match for the coaxial cable transmission line.

The key to providing a transmission line protector with low signal losses and reflections is in matching the characteristic impedance of every section of the protector with that of the transmission line it is intended to be used with. In the ideal configuration, the coaxial connectors, overcurrent protector, overvoltage protector, and transitional areas are designed with matching characteristic impedance. The characteristic impedance of a two-conductor transmission line is given by the following:

$$Zo = \sqrt{\frac{R + j \cdot 2\pi fL}{G + j \cdot 2\pi fC}}\ (\Omega),$$

where Zo is the characteristic impedance in ohms, f is the frequency in Hertz, j is the imaginary number, R is the resistance per unit length (both conductors) in ohms per meter, L is the inductance per unit length (both conductors) in Henries per meter, G is the conductance per unit length (between conductors) in Siemens per meter, and C is the capacitance per unit length (between conductors) in Farads per meter.

The characteristic impedance is unique at every cross-section in the transmission line; it is dependent on the physical dimensions, material properties, and the frequency of the signal. In the design of most protection the resistance and the conductance is extremely low and can be neglected. The equation for the characteristic impedance can then be approximated by:

$$Zo = \sqrt{\frac{L}{C}}\ (\Omega).$$

It can be seen from the above equation that the characteristic impedance is dependent on the ratio of the inductance to the capacitance of the transmission line. The connectors have a center-connector outer diameter, insulator shape, insulator material type, and outer-conductor inner diameter that all can be altered to achieve the proper characteristic impedance. The overcurrent protection printed circuit board has a trace width, thickness, configuration, and circuit board material and thickness that can be altered to design the proper characteristic impedance. The excess voltage protection device has a capacitance, that, when inserted into a coaxial transmission line, must be adjusted for in the design of the transmission line to ensure a characteristic impedance match. The physical addition of the excess voltage protection device into the transmission line also introduces undesirable inductance and capacitance effects that must be accommodated for in the design. When the excess voltage protection device is placed between the center and outer conductor of the coaxial transmission line, its capacitance is effectively in parallel with the inherent capacitance of the coaxial transmission line. This is adjusted for in the design by decreasing the inherent capacitance of the transmission line, increasing the inherent inductance of the transmission line, or both. In the preferred embodiment described here, this is accomplished by adjusting the inner conductor outer diameter, conductor material, dielectric material, outer conductor inner diameter, and excess voltage protection device placement.

BEST MODE FOR CARRYING OUT THE INVENTION

Figure 1:
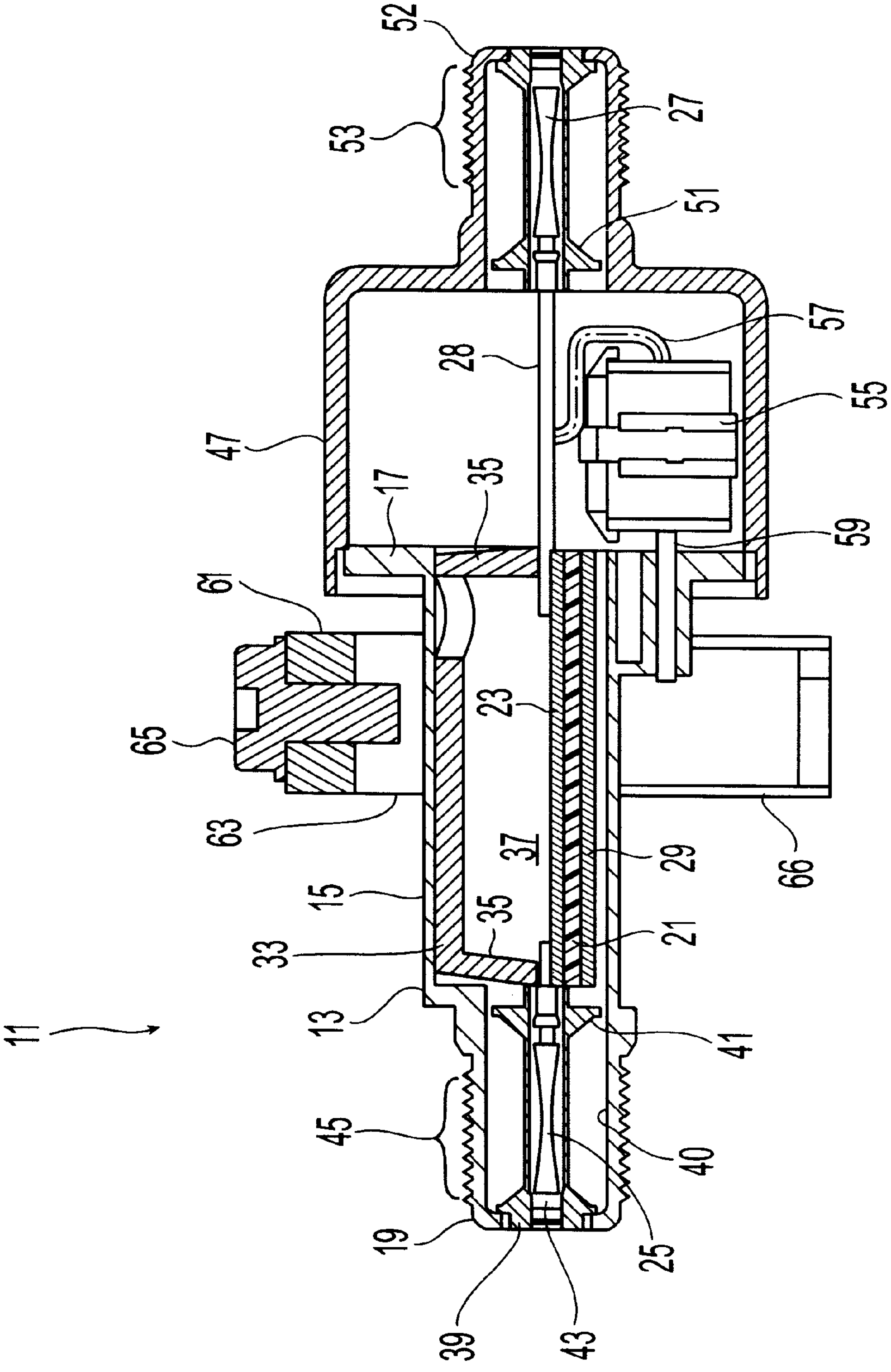
FIG. 1 is a sectional view of a protective device constructed in accordance with this invention.

Referring to FIG. 1, protective device 11 has a metal housing 13. Housing 13 has a fuse chamber 15 that is generally cylindrical. An external flange 17 is located on one end. A coaxial connector terminal 19 is located on the opposite end.

Figure 2:
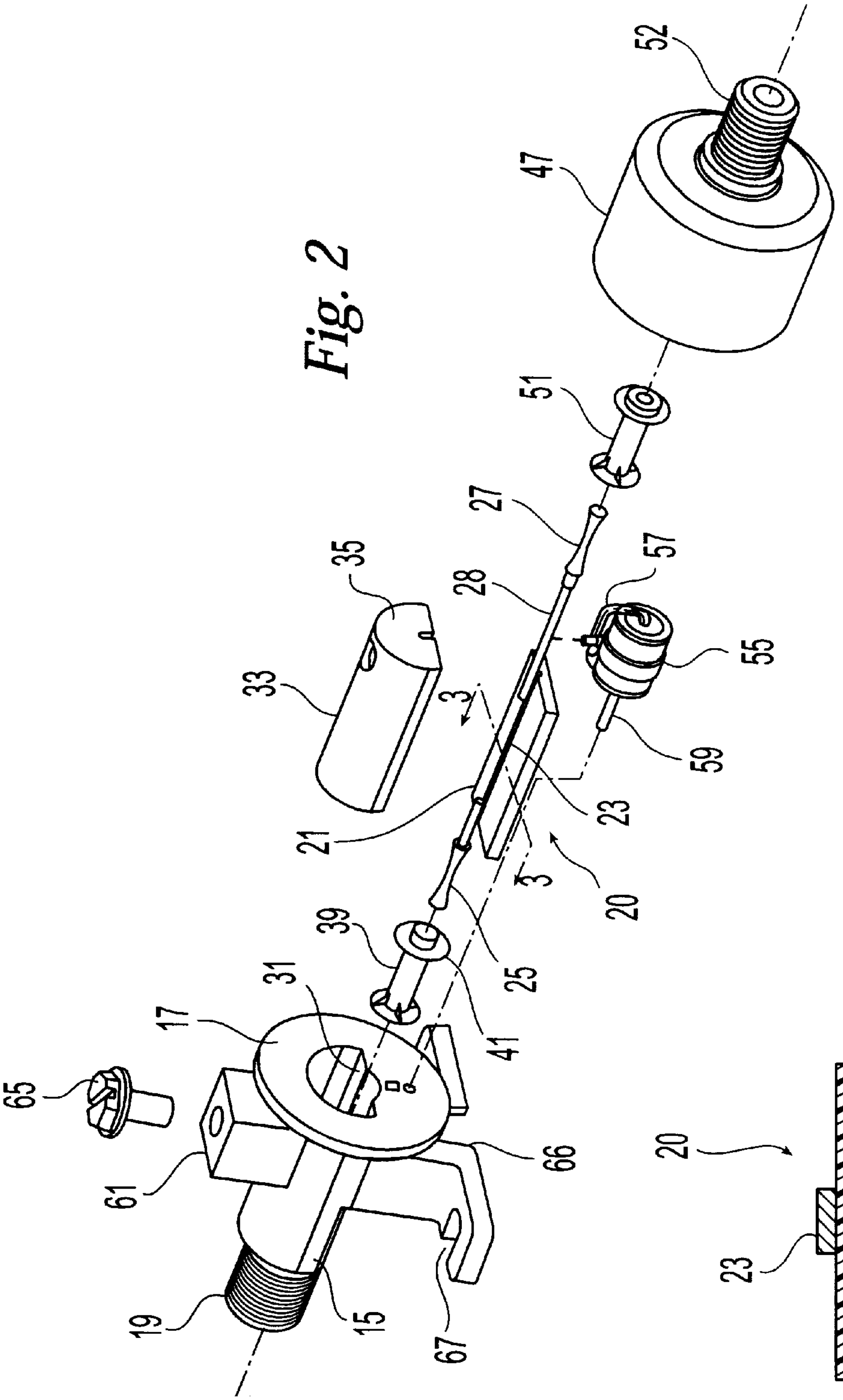
FIG. 2 is an exploded perspective view of the protective device of FIG. 1.
Figure 3:
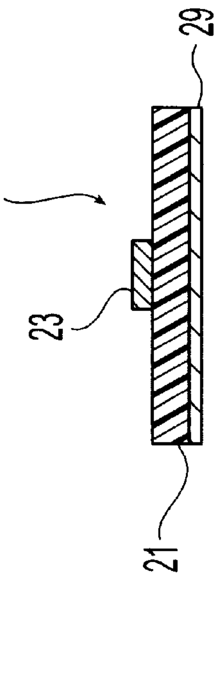
FIG. 3 is an enlarged sectional view of the protective device of FIG. 2, taken along line 3—3 of FIG. 2, with the traces shown enlarged in thickness for clarity.

A fuse element is located within fuse chamber 15. The fuse element is preferably a printed circuit board 20 that has a substrate 21 made of a dielectric material. Substrate 21 may be a single or multiple layers. Circuit board 20 is preferably rectangular, being thin and flat, and having a length of less than one inch and a width smaller than the length. A conductor trace 23 is formed on one side of substrate 21. Trace 23 has a width that is considerably less than the width of substrate 21. Trace 23 is generally straight and extends from or near one end to or near to the opposite end. A connector 25, which forms a part of coaxial terminal 19, is soldered to one end of trace 23. A connector 27 is electrically connected to the other end of trace 23 via an extension lead 28 that is soldered to trace 23. A conductor layer 29 (FIG. 3) is formed on the opposite side of substrate 21 from trace 23. Conductor layer 29 may have the same thickness but has a greater width, and thus cross-sectional area, than trace 23. Conductor layer 29 in the embodiment shown extends the full width of substrate 21. Alternately, conductor layer 29 could be two separate strips separated by a thin central gap. Conductor layer 29 is insulated from trace 23 by substrate 21. Conductor layer 29 is electrically connected to the metal of housing 13 by contact with shoulders 31 (FIG. 2) within fuse chamber 15. Trace 23 has a width, thickness, and length that causes it to open if it encounters current in excess of a selected amount for a selected time duration. In the preferred embodiments, trace 23 is between 0.001–0.003 inches thick, 0.03–0.07 inches wide, and 0.7–1.0 inches long; layer 29 is greater than 0.001 inches thick, 0.3–0.5 inches wide, and 0.7–1.0 inches long; and substrate 21 is between 0.04–0.07 inches thick, 0.3–0.5 inches wide, and 0.7–1.0 inches long. In the most preferred embodiment, trace 23 is 0.002 inches thick, 0.04 inches wide, and 0.8 inches long, layer 29 is 0.002 inches thick, 0.43 inches wide, and 0.85 inches long, and substrate 21 is 0.06 inches thick, 0.43 inches wide, and 0.95 inches long.

Circuit board 20 has a capacitance because of trace 23 and layer 29 being separated by substrate 21. This capacitance can be designed for characteristic impedance matching with the coaxial cable. Variations that are permissible in the elements to match the impedance include the thickness of substrate 21, the dielectric constant of substrate 21, and the width, thickness, shape, and material of trace 23 and layer 29.

The upper half of circuit board 20 is enclosed within fuse chamber 15 by an insulator shell 33. Shell 33 is a semi-cylindrical dielectric member that has an outer diameter portion equal to the inner diameter of an upper portion of fuse chamber 15. Dielectric end caps 35 are located on each end of insulator shell 33. A granular electrical insulation material 37, such as silica, is in the space between insulator shell 33 and circuit board 20. Shell 33 and insulation 37 insulate trace 23 from the metal of fuse chamber 15. Insulation is not required on the side of circuit board 20 that contains conductor layer 29 because layer 29 is grounded to housing 13.

Coaxial connector or terminal 19 is of a conventional type for connection to a conventional coaxial cable (not shown) with an insulated center conductor and an outer annular conductor. Coaxial terminal 19 includes an isolator 39 that is a dielectric member in the shape of a spool. Isolator 39 is located within a bore 40 in housing 13. Isolator 39 has flanges 41 that extend outward from a central axial portion. Flanges 41 engage bore 40. Connector 25 is inserted within a passage in the axial portion of isolator 39. Connector 25 has an axial receptacle 43. Exterior threads 45 are formed on housing 13 surrounding bore 40. Coaxial terminal 19 will receive a conventional coaxial cable connector (not shown) that has a threaded portion for engaging threads 45 and a small diameter pin would be aligned with receptacle 43. The pin is connected to the center conductor while the threaded coupling is connected to the outer conductor.

In the embodiment shown, housing 13 also has a protector chamber 47 located on one end of fuse chamber 15. Protector chamber 47 has a larger diameter than fuse chamber 15, having an inner bore that closely receives flange 17. Extension lead 28 extends through protector chamber 47 along the common axis of fuse chamber 15 and protector chamber 47. Connector 27 has the same structure as connector 25 and fits within an isolator 51, which forms a part of another coaxial terminal 52 secured to an end of housing 13 opposite coaxial terminal 19. Coaxial connector or terminal 52 is of the same type as coaxial terminal 19, also having threads 53 for connecting to a coaxial cable line.

An excess voltage protector 55 is mounted in protector chamber 47. Excess voltage protector 55 may be of a conventional design, including an air gap, a gas tube, or a solid state device such as a thyristor. In the embodiment shown, protector 55 is a gas tube type protector. It has one lead 57 that connects to extension lead 28. It has another lead 59 that is electrically connected to housing 13, which serves as a ground. Protector 55 will conduct if excessive voltage between extension lead 28 and housing 13 is encountered.

In the preferred embodiment shown, housing 13 has as an integral feature a mounting bracket 66 and a grounding terminal 61. Grounding terminal 61 has an aperture 63 that receives a ground wire (not shown). One end of the ground wire is secured to housing 13 in aperture 63 using threaded fastener 65. The other end of the ground wire is connected to a ground source in the junction box. Mounting bracket 66 may be used to mount protector device 11 in an appropriate position in a junction box. Mounting bracket 66 has lugs 67 for attachment to a junction box between the outside transmission network line and the inside lines in a business or home.

Protector 55 has a capacitance that should be accounted for in matching the impedance of protective device 11 to the transmission line. The capacitance of protector 55 is in parallel with the inherent capacitance of the transmission line formed by protector chamber 47 and extension lead 28, which reduces the effective capacitance of protector 11. The effective capacitance is approximately equal to the product of the capacitance of protector 55 times the transmission line capacitance formed by protector chamber 47 and extension lead 28 divided by the sum of the capacitances of protector 55 and the capacitance formed by protector chamber 47 and extension lead 28. As mentioned, the material and dimensions of protector chamber 47 and extension lead 28, and the placement of protector 55 and leads 57 and 59 may be varied to choose a desired characteristic impedance for protective device 11.

In operation, one end of a conventional coaxial cable will be connected to coaxial terminal 19 and another end of the coaxial cable will be connected to coaxial terminal 52. This places protective device 11 in series with the coaxial cable, separating an outside transmission network from an inside line leading to equipment in a business or home. The center conductor of the coaxial cable will electrically connect to connectors 25 and 27, and thus to trace 23. The outer conductor of the coaxial cable will connect through threads 45 and 53.

Signals on the center conductor will pass through trace 23. If excessive current is encountered for a sufficient duration of time, trace 23 will burn out or open, breaking the continuity between connector 25 and connector 27. Also, if excess voltage is encountered while trace 23 is still intact, protector 55 will conduct from extension lead 28 to the ground provided by housing 13.

The invention has significant advantages. The fuse assembly is much smaller in length than prior art fuses for coaxial cable. The fuse link, being precisely formed on a printed circuit board, will open predictably at desired current levels and time duration. The printed circuit board can be designed to match the impedance of the coaxial cable.

While the invention has been shown in only one of its forms, it should be apparent to those skilled in the art that it is susceptible to various changes without departing from the scope of invention. For example, although shown for use with coaxial cable, the protective device could also be adapted for use with other lines such as twisted-pair lines.

We claim:

1. A protective device for a coaxial cable having an inner conductor and an annular outer conductor, comprising:

a housing;

a pair of coaxial cable terminals on the housing, each of the terminals having an inner connector for electrically connecting to the inner conductor of the coaxial cable and an outer connector for electrically connecting to the outer conductor of the coaxial cable;

a fuse comprising a conductive trace and a conductive layer separated by a dielectric substrate, the conductive trace being electrically connected to the inner connectors of the terminals, the conductive layer being electrically connected to the outer connectors of the terminals, the fuse forming a circuit board having a preselected capacitance for characteristic impedance matching with the coaxial cable;

an outer conductive path within the housing between the outer connectors of the terminals for providing electrical continuity for the outer conductor of the coaxial cable; and a voltage protector electrically connected to the conductive trace and to a ground, the voltage protector conducting to the ground if the voltage on the inner conductor of the coaxial cable exceeds a predetermined value.

2. The protective device according to claim 1, wherein the housing comprises a first chamber and a second chamber separate from the first chamber and wherein the fuse is mounted in the first chamber and the voltage protector is mounted in the second chamber.

3. The protective device according to claim 1, wherein the conductive trace if formed on the dielectric substrate.

4. An integral protective assembly for a coaxial line, the coaxial line having an inner conductor, an annular outer conductor and a characteristic impedance, the protective assembly comprising:

a housing;

a pair of coaxial line terminals on the housing, each of the terminals having an inner connector for electrically connecting to the inner conductor of the coaxial line and an outer connector for electrically connecting to the outer conductor of the coaxial line;

a fuse disposed within the housing, the fuse comprising a conductive trace and a conductive layer separated by a dielectric substrate, the conductive trace being electrically connected to the inner connectors of the terminals, the conductive layer being electrically connected to the outer connectors of the terminals, the fuse forming a circuit board having a preselected capacitance; and a voltage protector disposed within the housing and electrically connected to the fuse;

wherein the characteristic impedance of the protective assembly is matched to the characteristic impedance of the coaxial line.

* * * * *

UNITED STATES PATENT AND TRADEMARK OFFICE

CERTIFICATE OF CORRECTION

PATENT NO. : 6,317,307 B1
DATED : November 13, 2001
INVENTOR(S) : Jon E. Bone, John J. Napiorkowski and Josh M. Wilken It is certified that error appears in the above-identified patent and that said Letters Patent is hereby corrected as shown below:

Title page,
Item [75], Inventors, change "Naplorkowski" to -- Napiorkowski -- and change "Wllken" to -- Wilken --.

Signed and Sealed this

Twenty-first Day of May, 2002

*Attest:*

JAMES E. ROGAN

*Attesting Officer* *Director of the United States Patent and Trademark Office*